(No Model.) 2 Sheets—Sheet 2.
G. TOLMIE.
CONDUIT SUPPLY SYSTEM FOR ELECTRIC RAILWAYS.
No. 547,304. Patented Oct. 1, 1895.
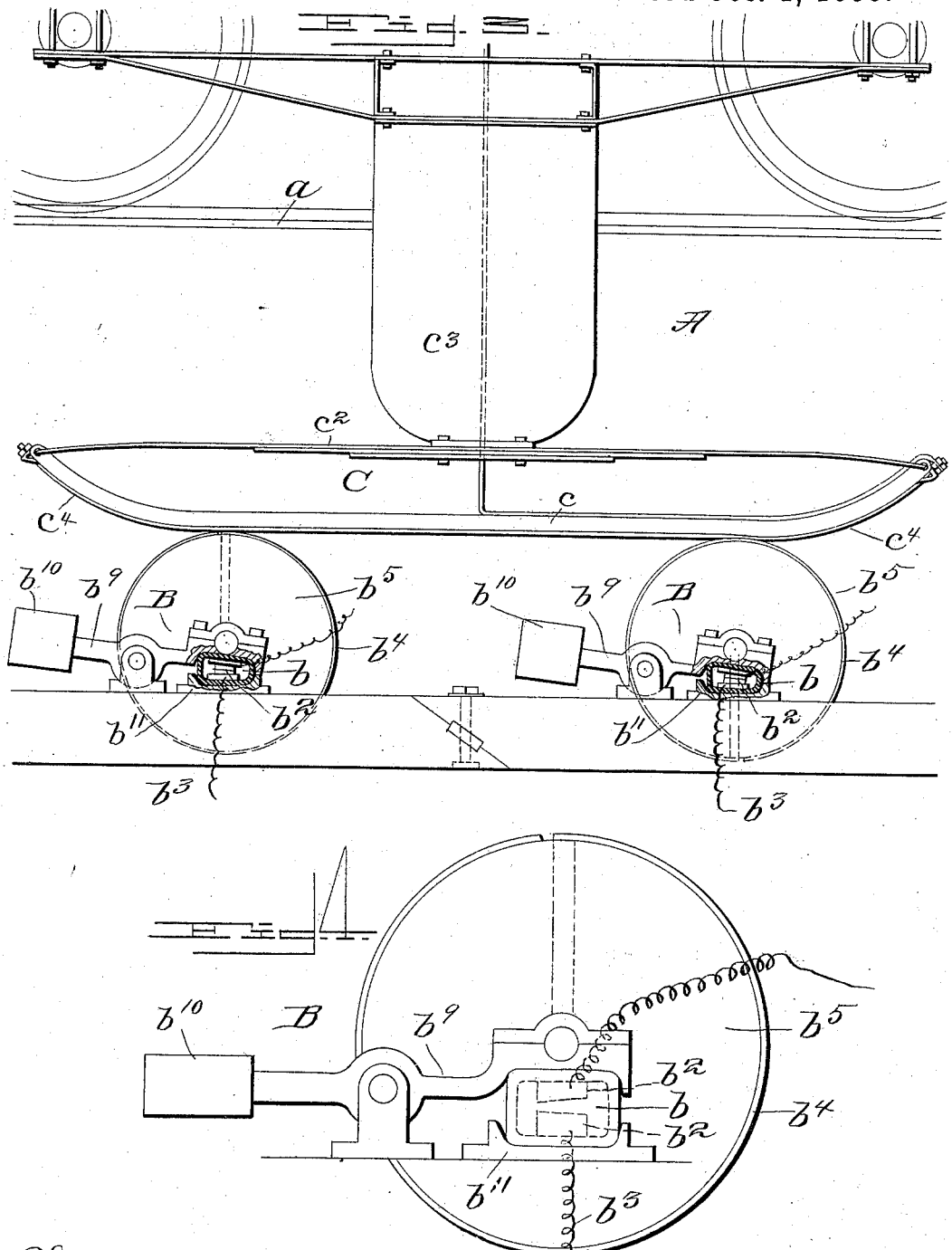

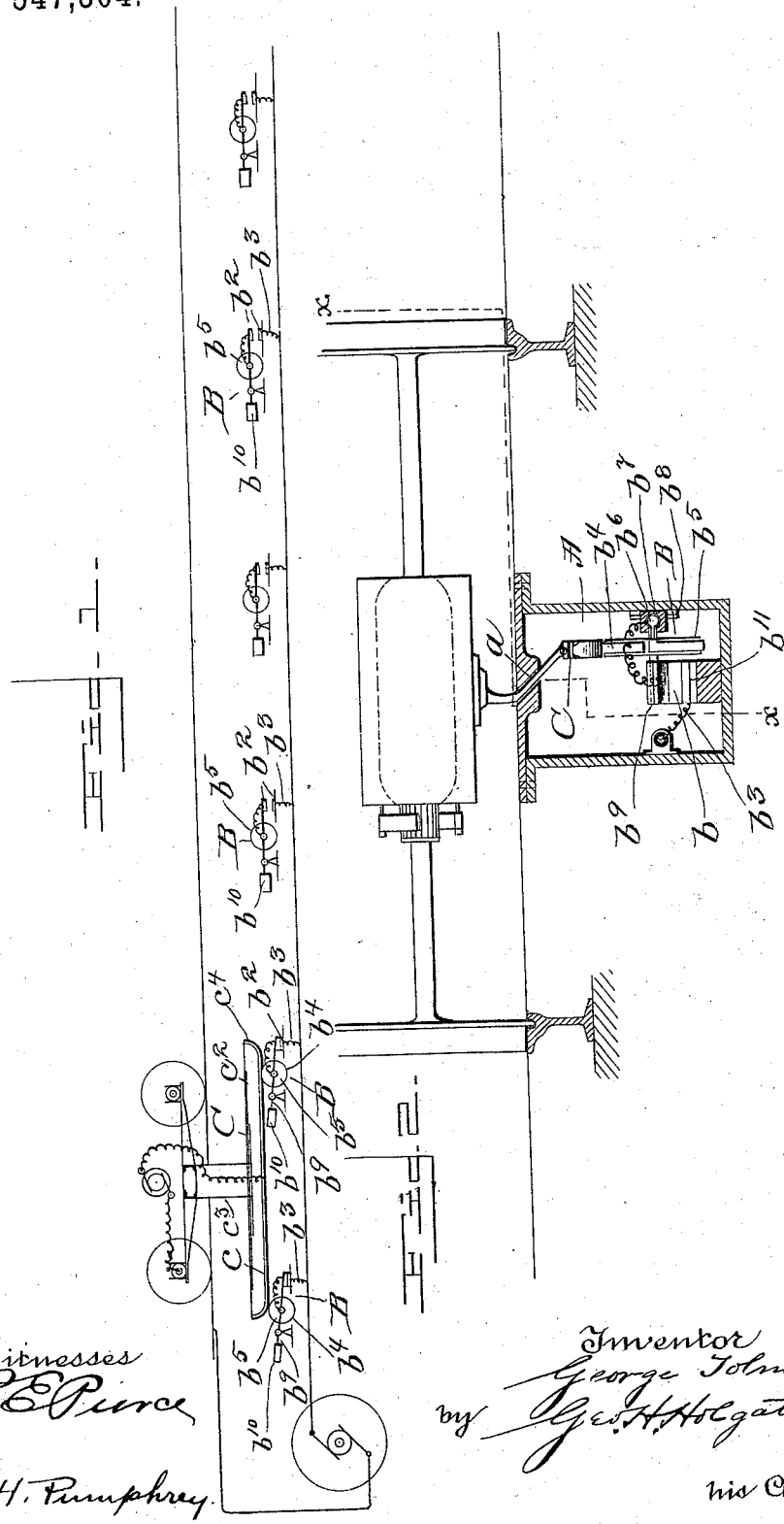

UNITED STATES PATENT OFFICE.

GEORGE TOLMIE, OF CARBON, WYOMING.

CONDUIT SUPPLY SYSTEM FOR ELECTRIC RAILWAYS.

SPECIFICATION forming part of Letters Patent No. 547,304, dated October 1, 1895.

Application filed July 10, 1894. Serial No. 517,106. (No model.)

*To all whom it may concern:*

Be it known that I, GEORGE TOLMIE, a citizen of the United States, residing at Carbon, in the county of Carbon and State of Wyoming, have invented a new and useful Improvement in Electric Conduit Systems, of which the following is a specification.

The invention relates to electric conduit systems.

The object is to produce an electric railway in which loss by atmospheric leakage, as well as by ground and short-circuiting, generally, will be reduced to a minimum, and, further, in which danger to man and beast will be entirely avoided and the operation rendered both safe and economical.

With these objects in view the invention consists in an electric-railway system comprising a conduit having mounted at intervals therein automatic circuit-closing devices, each consisting, essentially, of two metallic contact-points inclosed in a collapsible moisture-proof casing and sustained normally separated, one of the contact-points being electrically connected with a supply-lead, and a current-collector designed in its travel through the conduit to successively close the circuit through the contact-points of the devices; furthermore, in an electric-railway system comprising a conduit having mounted at intervals therein automatic circuit-closing devices, each consisting, essentially, of two metallic points inclosed in a collapsible moisture-proof casing, the casing being held extended, whereby the points are sustained normally separated, one of the contact-points being electrically connected with the supply-lead, and a current-collector designed in its travel through the conduit to bring the contact-points into engagement and thereby complete the circuit through itself to a motor; furthermore, in an electric-railway system comprising a conduit having mounted at intervals therein automatic circuit-closing devices, each consisting, essentially, of two contact-points fixed within a moisture-proof casing, the inclosing-casing of the chamber being elastic, whereby it will yield on the application of pressure, bringing the contact-points into engagement, electrical connections from a supply-lead to one of the points, and a current-gatherer designed in its travel through the conduit to effect the proper compression of the walls of the chamber and complete a circuit through itself to a motor, and, finally, in details of construction.

The invention is illustrated in the accompanying drawings, forming part of this specification, and wherein like letters indicate corresponding parts in the several views, in which—

Figure 1 is a view in diagram of one embodiment of the invention, showing a source of supply, such as a generator of electricity, an insulated supply-lead therefrom, a series of automatic circuit-closing devices arranged at intervals along adjacent to the lead, and being electrically connected therewith through insulated lateral branches, a current-gatherer depending from a truck movable upon the road-bed and closing the circuit through two of the devices by depressing rotatable disks carried at one end of weighted levers thereof, and thereby effecting a compression of collapsible elastic casings beneath the levers wherein contact-points are fixed. Fig. 2 is a view in vertical transverse section of the invention applied, showing the slotted conduit, the walls of the slot being inclined, a circuit-closing device within the conduit, the weighted lever under one end of which the collapsible casing containing the contact-points is seated, a disk rotatably mounted upon the lever and provided with an encircling-band, the ends of the band being fixed, slightly separated, and one extended radially toward the center of the disk, then outward axially and terminating in a spherical head, an inclosing-casing for the head, and a connection therefrom to the upper contact-point, a current-gatherer depending from a truck upon the road-bed and projecting through the slot into engagement with the band of the disk, a supply-lead, and an electrical connection from the lead to the lower contact-point. Fig. 3 is a view in vertical longitudinal section, taken on the line *x x* of Fig. 2, showing a conduit having automatic circuit-closing devices mounted at intervals therein, and consisting, respectively, of two contact-points held within an elastic collapsible moisture-proof box or casing, and the casing mounted by being seated in a suitable bed or casting, a pivoted lever weighted at its outer end and having its opposite end cut away in a manner to partially inclose the box or casing, a rotatable disk journaled at the inner end of the lever and provided with an encircling metallic conductor in the form of a tire, which is electrically connected with the upper contact-point, a current-gatherer depending from a car-truck and projecting through the slot into the conduit, the current-gatherer being of a length suitable for bridging the space between two of the circuit-closing devices, and electrical connections from the supply-lead to the lower contact-point within the box or chamber. Fig. 4 is a view in elevation on an enlarged scale of one of the circuit-closing devices.

In the drawings, A represents a conduit of suitable size and shape located, preferably, between the rails of the track upon the roadbed and having a slot $a$ therein, the walls of the slot being inclined or cut at an angle, whereby the entrance of vehicle-wheels is rendered impossible.

B represents circuit-closing devices equi-spaced within along the bottom of the conduit, and comprising, respectively, an elastic collapsible box or casing $b$, provided with two metallic projections or contact-points $b^2$, extending in opposite directions from the bottom and top walls within the chamber, the lower point being electrically connected by an insulated branch wire $b^3$ with the main or supply lead, which may be located in or adjacent the conduit, and the upper point being electrically connected with a conductor $b^4$ in the form of an encircling-tire on disk $b^5$ through the radial extension shown in dotted lines, Fig. 4, which connects with the shaft of the disk. The ends of the tire are fixed to the disk, slightly separated, and one extended radially to the center, then axially from the disk and terminating in a spherical head $b^6$, inclosed by a casing $b^7$, movable in guides $b^8$. From this head connection is made by an insulated wire or other conductor with the contact-point. This disk is rotatably mounted and vertically movable by being journaled in bearings at one end of a lever $b^9$, which is pivoted at or near its center and provided at the opposite end with a weight $b^{10}$, by which it is normally held clear of the casing. The under side of the lever is cut away at or near the end, so as to partially inclose the collapsible box or casing, which is seated in the casting $b^{11}$ in a manner to be compressed between the end of the lever and the casting on the application of pressure at the circumference of the disk. The compression of the casing serves to effect an engagement between the projections or points within the casing and complete the circuit.

C represents the current-gatherer depending through the slot of the conduit and provided with a bar $c$, which is yieldingly connected by one or more springs $c^2$ with a support $c^3$, the bar having insulated therefrom a metallic facing $c^4$, having its extremities threaded and passed through suitable projections on the bar $c$, and nuts turned onto the threaded portions, whereby the facing may be adjustably tensioned for engagement with the encircling-conductors of the disk, the facing being curved upward at its ends, whereby successive engagements as the bar passes from one disk to the next will be free from shocks and strains.

In operation the current-gatherer is placed in position by being passed through the slot of the conduit and properly adjusted. On coming into engagement with the disk of the first circuit-closing device the weight thereof exerted as pressure upon the disk will depress it and effect a compression of the yielding casing, bringing the metallic projections or points therein together and completing the circuit, which would be from the supply-lead through the branch wire to the under or lower projection, thence through the upper projection to the encircling conductor or tire of the disk by a branch wire and the radial extension forming part of tire, thence through the metallic facing of the current-collector and by a suitably-insulated conductor to the motor on the car, return being preferably by the rails.

Having thus described the invention, what I claim as new, and desire to secure by Letters Patent, is—

1. In a circuit closing device, the combination with two metallic projections supported normally out of contact; of a collapsible moisture-proof casing therefor; a weighted pivoted lever having a movable projection at one end, provided with a conductive facing, which said end is attached to the casing; electrical connections between the said facing and one of the points within the casing; electrical connections between the opposing point within the casing and a feed conductor; and a collector adapted to engage the projection on the lever and depress it, to establish contact between the points within the casing.

2. In a circuit closing device, comprising two projections, arranged normally out of contact within an elastic moisture proof casing, a pivoted lever, having one end weighted, and the opposite end lying above the elastic casing, and provided with a rotatable disk, having an encircling metallic conductor, electrically connected with one of the projections of the casing, the other projection being electrically connected with a supply lead, and the current gatherer, adapted to engage and depress the disk, whereby the casing is compressed and the circuit is completed through the inclosed projections, as specified.

In testimony whereof I have affixed my signature in the presence of two subscribing witnesses.

GEORGE TOLMIE.

Witnesses:
L. R. MEYER,
ALEXANDER SMART.